US009461731B1

(12) United States Patent
Cohen

(10) Patent No.: US 9,461,731 B1
(45) Date of Patent: Oct. 4, 2016

(54) BENT-PIPE RELAY COMMUNICATION SYSTEM WITH AUTOMATIC GAIN CONTROL AND METHODS OF USING SAME

(71) Applicant: The United States of America, as represented by the Secretary of the Navy, Washington, DC (US)

(72) Inventor: Aaron E. Cohen, Alexandria, VA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 14/963,354

(22) Filed: Dec. 9, 2015

(51) Int. Cl.
*H04B 7/15* (2006.01)
*H04B 7/14* (2006.01)
*H04B 17/02* (2006.01)
*H04B 7/185* (2006.01)
*H04B 1/40* (2015.01)

(52) U.S. Cl.
CPC ............... *H04B 7/185* (2013.01); *H04B 1/40* (2013.01)

(58) Field of Classification Search
CPC .................................................... H04B 7/185
USPC .......................................... 455/11.1, 7, 9, 16
See application file for complete search history.

(56) References Cited

U.S. PATENT DOCUMENTS

| | | | | |
|---|---|---|---|---|
| 6,714,760 B2* | 3/2004 | Robinett | ................ | H04B 1/005 455/3.02 |
| 8,982,773 B2* | 3/2015 | Ros | ....................... | H04B 7/185 370/316 |
| 9,178,683 B2* | 11/2015 | Varma | ................... | H04L 7/0008 |
| 2002/0193108 A1* | 12/2002 | Robinett | ............ | H04B 7/18563 455/427 |
| 2013/0034050 A1* | 2/2013 | Ros | ........................ | H04B 7/185 370/316 |
| 2013/0315346 A1* | 11/2013 | Varma | ................... | H04L 7/0008 375/316 |
| 2014/0080435 A1* | 3/2014 | Mohammad | ......... | H03G 3/3078 455/234.2 |
| 2015/0296409 A1* | 10/2015 | Xu | ........................ | H04B 7/185 370/236 |

OTHER PUBLICATIONS

Heide, David A. et al., Variable Data Rate Vocoder Improvements for Secure Interoperable DoD Voice Communications, The 2013 Military Communications Conference, MILCOM 2013, Nov. 18-20, 2013, IEEE, New York, NY, USA.

(Continued)

*Primary Examiner* — Tilahun B Gesesse
(74) *Attorney, Agent, or Firm* — US Naval Research Laboratory; Suresh Koshy

(57) ABSTRACT

A bent-pipe relay communication system and method of using same. The bent-pipe relay communication system includes a plurality of bent-pipe relay channels, each channel having automatic gain control. Each channel of the plurality of bent-pipe relay channels includes a radio-frequency-to-intermediate-frequency demodulator, at least one programmable variable gain amplifier, and an intermediate-frequency-to-radio-frequency modulator. The communication system further includes at least one radio frequency power detector operably connected to the intermediate-frequency-to-radio-frequency modulator for each channel. The system also includes at least one controller communicating with the at least one radio frequency power detector and the at least one variable gain amplifier for the each channel to provide the automatic gain control.

23 Claims, 8 Drawing Sheets

(56) References Cited

OTHER PUBLICATIONS

Rupar, Michael A. et al., High Altitude Relay and Router (HARR), Naval Research Laboratory, NRL/FR/5554-08-10,168, Nov. 20, 2008, Washington DC, USA.

Heide, David A. et al., Universal Vocodor Using Variable Data Rate Vocoding, Naval Research Laboratory, NRL/FR/5555-13-10,239, Jun. 14, 2013, Washington, DC, USA.

Moran, Thomas et al., An Overview of the Tactical Secure Voice Cryptographic Interoperability Specification, The 2010 Military Communications Conference, MILCOM 2010, Oct. 31, 2010-Nov. 2, 2010, IEEE, New York, NY, USA.

Knoblach, Jerry, Combat SkySat: Wide Area Sensing and Communications, www.spacedata.net, Mar. 8, 2011, Space Data Corporation, Chandler, Arizona, USA.

Doffoh, Jonathan, High Altitude Relay and Router for Over-the-Horizon Networks, The 2006 Military Communications Conference, MILCOM 2006, Oct. 23-26, 2006, IEEE, New York, NY, USA.

Shahan, Patrick et al., Comparison of TSVCIS Voice at 8000 and 12000 BPS Versus CVSD at 16000 BPS, The 2012 Military Communications Conferences, MILCOM 2012, Oct. 29, 2012-Nov. 1, 2012, IEEE, New York, NY, USA.

* cited by examiner

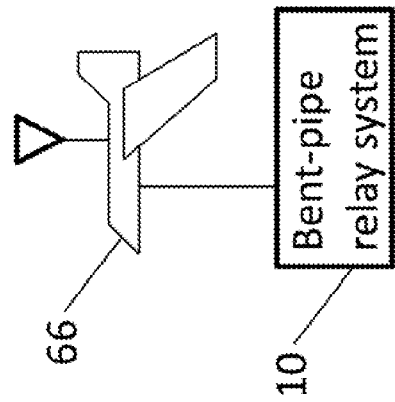
FIG. 2C
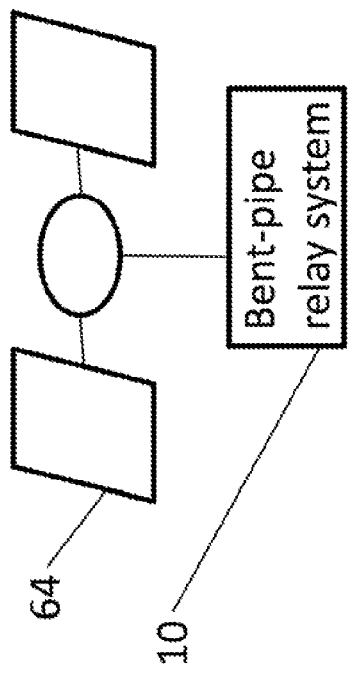
FIG. 2B
FIG. 2A

BENT-PIPE RELAY COMMUNICATION SYSTEM WITH AUTOMATIC GAIN CONTROL AND METHODS OF USING SAME

FIELD OF THE INVENTION

The invention relates generally to bent-pipe relay communication systems and methods of using same, and more particularly to analog bent-pipe relay communication systems with automatic gain control and methods of using same.

BACKGROUND OF THE INVENTION

An enormous debris cloud is accumulating in the Earth's atmosphere. The debris cloud primarily comprises spent rocket bodies, dead satellites, and fragments generated when such objects collide. For example, in January 2007, China conducted its first anti-satellite missile test, destroying a Chinese weather satellite. As another example, in February 2009, a dead Russian military satellite slammed into an active U.S. communications satellite, creating two new clouds of space junk. NASA estimates that there are about 22,000 pieces as large as a softball, 500,000 pieces of space debris bigger than a marble, and hundreds of millions of flecks at least 1 millimeter in diameter. These pieces are moving so fast that any one of them could knock out one of the 1,000 or so operational satellites. That is a non-trivial potential problem, given increasing societal dependence on satellite communications, particularly in remote regions of the Earth.

BRIEF SUMMARY OF THE INVENTION

In view of the above, Inventor recognized a need for a method and system for beyond-line-of-sight communications for voice and narrow band data in challenging terrains that normally truncate links. Inventor further appreciated that analog bent-pipe relays do not have the ability to ensure that the output power stays in a specified limit range and therefore would benefit from the addition of automatic gain control.

An embodiment of the invention includes a method of providing automatic gain control for a bent-pipe relay communications system. The bent-pipe relay communications system includes a plurality of bent-pipe relay channels. Each channel of the plurality of bent-pipe relay channels includes at least one programmable variable gain amplifier and an output power detector communicating with the variable gain amplifier. An output power level of an intermediate frequency range analog signal in the each channel of the plurality of bent-pipe relay channels is sampled using the each output power detector. The output power level is compared to a power threshold range. The power threshold range includes a threshold power, the threshold power plus a power offset, and the threshold power minus the power offset. A gain of the intermediate frequency range analog signal is reduced by a percentage or a fixed amount after at least one gap between a plurality of signal transmissions, if the output power level is above the power threshold range, by controlling the at least one variable gain amplifier. The gain of the intermediate frequency range analog signal is increased by the percentage or the fixed amount, if the output power level is below the power threshold range, by controlling the at least one variable gain amplifier. The comparing the output power level to the power threshold range, the reducing by one of the percentage and the fixed amount the gain of the intermediate frequency range analog signal, and the increasing by one of the percentage and the fixed amount the gain of the intermediate frequency range analog signal are repeated until an initial power level of the intermediate frequency range asymptotically approaches the threshold power.

Another embodiment of the invention includes a bent-pipe relay communication system. The bent-pipe relay communication system includes a plurality of bent-pipe relay channels, each channel of said plurality of bent-pipe relay channels comprising one of a voice channel and a data channel, said each channel of said plurality of bent-pipe relay channels comprising a radio-frequency-to-intermediate-frequency demodulator, at least one programmable variable gain amplifier, and an intermediate-frequency-to-radio-frequency modulator. The communication system further includes at least one radio frequency power detector operably connected to the intermediate-frequency-to-radio-frequency modulator for each channel. The system also includes at least one controller communicating with the at least one radio frequency power detector and the at least one variable gain amplifier for the each channel. The at least one controller samples an output power level of an intermediate frequency range analog signal in the each channel of the plurality of bent-pipe relay channels. The at least one controller compares the output power level to a power threshold range. The power threshold range includes a threshold power, the threshold power plus a power offset, and the threshold power minus the power offset. The at least one controller reduces by a percentage or as fixed amount an initial power level of the intermediate frequency range analog signal after at least one time gap between a plurality of signal transmissions, if the output power level is above the power threshold range, by reducing a gain of said at least one variable gain amplifier. The at least one controller increases by the percentage or the fixed amount the initial power level of the intermediate frequency range analog signal, if the output power level is below the power threshold range, by increasing the gain of the at least one variable gain amplifier. The at least one controller repeats the comparing the output power level to the power threshold range, the reducing by one of the percentage and the fixed amount the initial power level of the intermediate frequency range analog signal, and the increasing by one of the percentage and the fixed amount the initial power level of the intermediate frequency range analog signal until the initial power level of the intermediate frequency range asymptotically approaches the threshold power.

BRIEF DESCRIPTION OF THE DRAWINGS

FIG. 2A is a diagram of an illustrative mobile platform according to an embodiment of the invention in the form of a balloon.

FIG. 2B is a diagram of an illustrative mobile platform according to an embodiment of the invention in the form of a satellite.

FIG. 2C is a diagram of an illustrative mobile platform according to an embodiment of the invention in the form of an aerial vehicle.

DETAILED DESCRIPTION OF THE INVENTION

Figure 1:
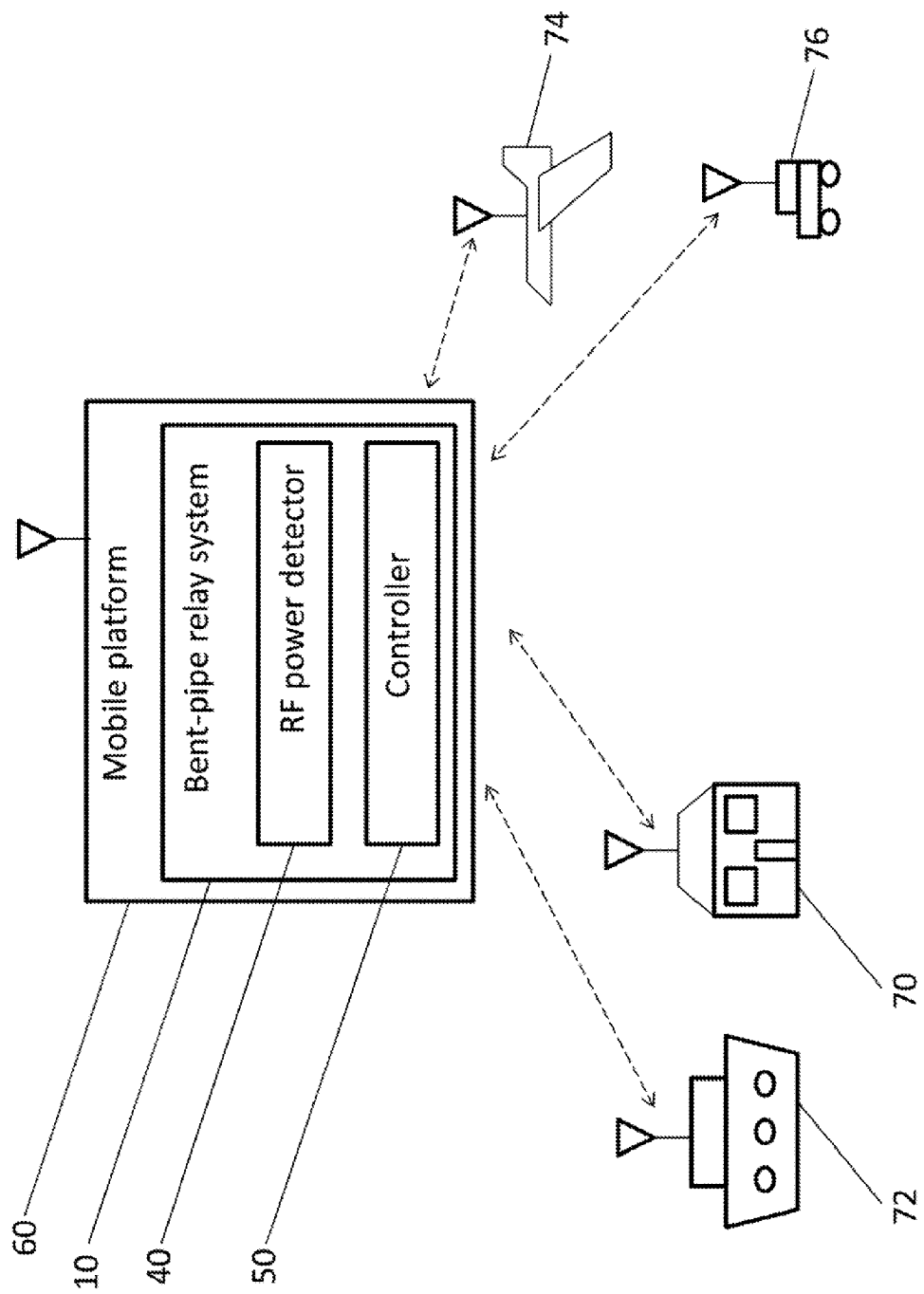
FIG. 1 is a diagram of an illustrative bent-pipe relay communications system according to an embodiment of the instant invention in communication with illustrative users.
Figure 3:
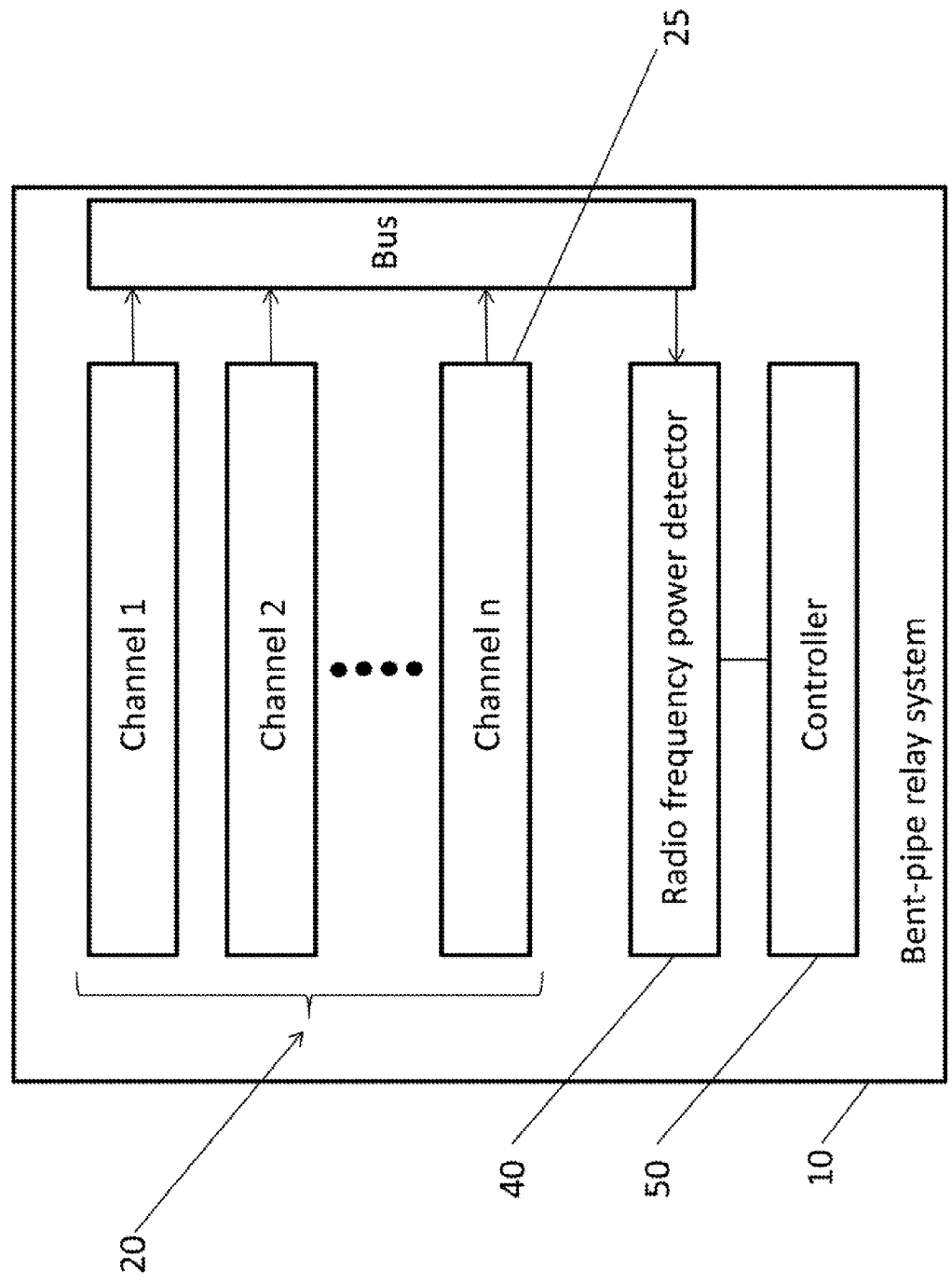
FIG. 3 is a block diagram of an illustrative bent-pipe relay communications system according to an embodiment of the instant invention.

Inventor appreciated that, by design, conventional analog bent-pipe relays do not have the ability to ensure that the output power stays in a specified limit range regardless of input power without the addition of automatic gain control. Inventor then recognized that such automatic gain control functionality requires power detectors and variable gain amplifiers in the radio frequency chain along with a separate controller device that determines the correct settings for the variable gain amplifiers.

An embodiment of the invention includes a method of providing automatic gain control for a bent-pipe relay communications system 10, as shown by way of illustration in FIGS. 1, 3, and 5-8. The bent-pipe relay communications system 10 includes a plurality of standard bent-pipe relay channels 20. For example, acceptable relay channels in the plurality of bent-pipe relay channels 20 include standard amplify-forward relays. Each channel 25 of the plurality of bent-pipe relay channels 20 includes at least one standard programmable variable gain amplifier 30 and a standard output radio frequency power detector 40 communicating with the variable gain amplifier. For example, the plurality of bent-pipe relay channels 20 is connected to the radio frequency power detector 40 by way of a standard bus. An output power level of an intermediate frequency range analog signal in the each channel 25 of the plurality of bent-pipe relay channels 20 is sampled using the each output power detector 40. The output power level is compared to a power threshold range. The power threshold range includes a threshold power, the threshold power plus a power offset, and the threshold power minus the power offset. A gain of the intermediate frequency range analog signal is reduced by a percentage or a fixed amount after at least one gap between a plurality of signal transmissions, if the output power level is above the power threshold range, by controlling the at least one variable gain amplifier 30. The gain of the intermediate frequency range analog signal is increased by the percentage or the fixed amount, if the output power level is below the power threshold range, by controlling the at least one variable gain amplifier 30. The comparing the output power level to the power threshold range, the reducing by one of the percentage and the fixed amount the gain of the intermediate frequency range analog signal, and the increasing by one of the percentage and the fixed amount the gain of the intermediate frequency range analog signal are repeated until an initial power level of the intermediate frequency range asymptotically approaches the threshold power.

Optionally, a standard controller 50 communicating with each variable gain amplifier 30 and each output power detector 40 is provided. The controller 50, for example, includes a standard microcontroller, a standard microprocessor, a standard central processing unit, a standard field programmable gate array, or a standard system-on-chip. Alternatively, optionally, a plurality of standard controllers is provided, a respective controller communicating with a respective variable gain amplifier and a respective output power detector, wherein at least one controller of the plurality of controllers comprises a standard microcontroller, a standard microprocessor, a standard central processing unit, a standard field programmable gate array, or a standard system-on-chip.

Optionally, a sampling period for each channel 25 of the plurality of bent-pipe relay channels 20 is adjusted, using at least one controller 50, based on whether the intermediate frequency range analog signal comprises a data waveform or a voice waveform.

Optionally, the sampling an output power level of an intermediate frequency range analog signal in the each channel 25 of the plurality of bent-pipe relay channels 20 using the each output power detector 40 comprises measuring a plurality of voltage levels over time to determine one of a maximum power level for the intermediate frequency range analog signal, and a maximum voltage level corresponding to the maximum power level for the intermediate frequency range analog signal. Optionally, the threshold power is adjusted based on one of whether the maximum power level is different from a current power level, and whether the maximum voltage level is different from a current voltage level.

In an illustrative embodiment of the invention, for N bent-pipe relay channels 20, each channel's AGC update settings are described as follows. Automatic gain control is separated for each independent channel 25. The frequency of updating is independently programmable for each channel and can be controlled by issuing the corresponding command to our communications payload for each channel. For each channel 25, the controller 50 queries whether the time is greater than a desired automatic gain control threshold. For each channel 25, if the time is not greater than the desired automatic gain control threshold, then the controller 50 waits and/or gets a new time. For each channel 25, if the time is greater than the desired automatic gain control threshold, then the controller 50 runs the automatic gain control update process. For example, the controller's queries are performed sequentially by channel or simultaneously.

In an illustrative embodiment of the invention, the automatic gain control process for one channel is described as follows, wherein each channel 25 has its own gain and step values which is used to determine how to update the gain daring active (and inactive) transmissions. This process runs during each update based on the channel's AGC update settings. The update process checks the current input power level against a target threshold. The target threshold is optionally programmable. Based on this comparison, the stepsize is updated. After the stepsize has been updated, the current gain is updated to generate the new desired gain. The new desired gain is converted into device settings for the variable gain amplifier(s). (Recall that each channel has at least one variable, gain amplifier; for example, an embodiment of the invention includes two variable gain amplifiers per channel.) If there are changes to the variable gain amplifier(s) to achieve the new desired gain, then the variable gain amplifier(s) is/are correspondingly programmed. Minimizing programming of the variable gain amplifier(s) is, for example, important to ensure clean signal transmissions. Finally, the gain and stepsize are stored, or returned, for the next update cycle. The update stepsize process checked as to whether the stepsize is close to zero. "Close to zero" is described as follows. If a stepsize is smaller than the smallest amount by which the gain can be changed, then the stepsize is considered "close to zero" according to an embodiment of the invention. For example, if 0.5 dB is the smallest change in gain permissible for a given variable gain amplifier and my stepsize is 0.01 dB, then the stepsize is deemed close to zero because a positive or negative change in the stepsize would not generate a change in the device settings of the variable gain amplifier. If the stepsize is close to zero, then the stepsize is set to the max stepsize (-power_difference/2). For the less than '<' process, an additional comparison is performed using the maxsample output. If maxsample is above the threshold, then the stepsize is set to zero to prevent it from changing unnecessarily. For the greater than '>' process, the past samples are reset to zero. Below is illustrative code that implements this feature:

```
//Shift and Add Sample to past samples
//Also Rank-Order Filter past samples (take largest rank 1)
maxsample=pastsamples[1];
for (i=0;i<nTail; i++) {
pastsamples[i]=pastsamples[i+1];
maxsample=(maxsample<pastsamples[i+1])?pastsamples[i+1]: maxsample;
}
pastsamples[nTail]=VRF;
maxsample=(maxsample<VRF)?VRF:maxsample;
if (VRF>VRF_FIXED+VRF_OFFSET) {
//TOO Big drive gain down
//(*stepsize)=-power_difference;
if (((*stepsize)<0.01)||((*stepsize)>-0.01))(*stepsize)=-power_difference/2.0;
else(*stepsize)=((*stepsize))/2.0;
//reset past samples
for (i=0; i<=nTail; i++) pastsamples[i]=0;
} else if (VRF<VRF_FIXED-VRF_OFFSET) {
//TOO Small drive gain up
//(*stepsize)=-power difference;
if (((*stepsize)<0.01)||((*stepsize)>-0.01))(*stepsize)=-power_difference/2.0; //delta/10
or maybe 1 is sufficient?
else(*stepsize)=((*stepsize))/2.0;
//halt slow increase if past history from rank order filter shows large amplitude
if (maxsample>VRF_FIXED-VRF_OFFSET)(stepsize)=0.0;
} else {//else do nothing if VRF_FIXED-VRF_OFFSET<=VRF<=VRF_FIXED+VRF_OFFSET
(*stepsize)=0.0;//reset stepsize since we have fallen within offsets
return;
}
```

One of ordinary skill in the art will readily appreciate that alternative codes that perform this function fall within the scope of the instant invention.

The update gain process, for example, computes a new gain as newgain=currentgain +stepsize. Then, it is rate-limited to the upper and lower bounds for the system. For Surrogate TACSAT, for example, each channel has an achievable range of [-63 dB, 0 dB]. Afterwards, the new VGA attenuation settings are determined based on preferring to perform attenuation on the transmitter side first before attenuating the receiver side. A programmable limit on the transmitter side VGA is performed here based on a comparison with max_vga2_gain. A comparison of the new VGA settings with the old VGA settings is performed. If a change has occurred, then the device or devices is programmed with the updated settings. The new settings are saved. Below is illustrative code that implements this feature:

```
//Calculate current VGA settings
old_VGA1=status_vga[2*(channel)~1)+(0)];//RX
old_VGA2=status_vga[2*(channel)~1)+(1)];//TX
gain=0-old_VGA1-old_VGA2;//[0,-63 dB]
//Update Gain using StepSize
gain=gain+(*stepsize);
if (gain<-63) gain=-63;//minimum gain
if (gain>0) gain=0; //maximum gain
//Compute new VGA settings
if (gain<=-31.5) {
new_VGA1=floor(2.0*abs(gain+31.5))/2.0;raise RX vga
new_VGA2=31.5;//TX stays low
} else {
new_VGA1=0.0;//need more gain than RX VGA can provide
new_VGA2=floor(2.0*abs(gain))/2.0;//raise TX vga
if         (new_VGA2<max_vga2_gain)
new_VGA2=max_vga2_gain;
}
//Set new VGA settings
if (old_VGA1 !=new_{VGA}1) {
vgaSetGainQuiet((int)(new_VGA1*2.0));
vgaProgramGain(2*(channel-1)+(0));
status_vga[2*(channel-1)+(0)]=new_VGA 1;
}
if (old_VGA2!=new_VGA2) }
vgaSetGainQuiet((int)(new_VGA2*2.0));
vgaProgramGain(2*(channel-1)+(1));
status_vga[2*(channel-1)+(1)]=new_VGA2;
}
```

One of ordinary skill in the art will readily appreciate that alternative codes that perform this function fall within the scope of the instant invention.

Optionally, the bent-pipe relay communication system 10 includes a standard mobile platform or station 60, the mobile platform comprising a standard balloon 62, a standard manned or unmanned aerial vehicle 64, or a standard satellite 66, such as shown by way of illustration in FIG. 2. For example, a balloon according to an embodiment of the instant invention includes a standard high altitude weather balloon, a standard zero pressure balloon, or a standard ballast balloon. For example, a balloon according an embodiment of the invention bears aloft two payloads, one carrying a telemetry functionality and one carrying a communications relay functionality according to an embodiment of the instant invention.

Advantages of high altitude balloon relays over satellites include costs and latency. The commercial Space Data's Combat SkySat system costs on the order of $6,000 per flying platform, and this cost estimate does not include the expense for their ground control platform. This total cost estimate is considerably less than an approximately $300 million cost of a geosynchronous satellite plus associated terminals, which collectively have been one of the "go to"

platforms for beyond line of sight ("BLOS") communications. Additionally, high altitude relays, such as provided using a balloon, have a shorter latency than geosynchronous satellites. High-altitude relays are on the order of 65,000 feet above ground level, whereas the geosynchronous satellites are around 22,300 miles above ground level. Not surprisingly, round trip times to the high altitude relays are substantially less than for geosynchronous satellites. Such high-altitude relays, for example, provide connectivity to nodes as far as 150 nmi from the relay payload.

Optionally, a first radio frequency range signal is received from a first station, for example, as shown by way of illustration in FIG. 1. The first station is fixed or mobile. The first station is land-based, air-based, or water-based. For example, a fixed, land-based station is a standard building 70. For example, a mobile, water-based station is a standard watercraft such as a standard ship 72. The first radio frequency range signal is analog or digital.

Optionally, a second radio frequency range analog signal is transmitted to a second station. The second station is fixed or mobile. The second station is located land-based, air-based, or water-based. For example, a mobile, air-based station is a standard aircraft 74. For example, a mobile, land-based station is a standard land vehicle such as a standard car or truck 76. The second radio frequency range signal is analog or digital.

Optionally, the first radio frequency range signal is demodulated to the intermediate frequency range signal. The intermediate frequency range signal is modulated to the second radio frequency range analog signal. The receive frequency range for an embodiment of the invention, for example, is between 30 and 50 MHz; the transmit frequency range for an embodiment of the invention, for example, is between 55 MHz and 88 MHz.

Another embodiment of the invention includes a bent-pipe relay communication system 10, such as shown by way of illustration in FIGS. 1, 3, and 5-8. The bent-pipe relay communication system 10 includes a plurality of bent-pipe relay channels 20. Each channel of the plurality of bent-pipe relay channels includes a voice channel or a data channel. The each channel of the plurality of bent-pipe relay channels includes a radio-frequency-to-intermediate-frequency demodulator 90, at least one programmable variable gain amplifier 30, and an intermediate-frequency-to-radio-frequency modulator 110. The communication system 10 further includes at least one radio frequency power detector 40 operably connected to the intermediate-frequency-to-radio-frequency modulator 110 for each channel. The communication system 10 also includes at least one controller 50 communicating with the at least one radio frequency power detector 40 and the at least one variable gain amplifier 30 for the each channel. The at least one controller 50 samples an output power level of an intermediate frequency range analog signal in the each channel 25 of the plurality of bent-pipe relay channels 20. The at least one controller 50 compares the output power level to a power threshold range. The power threshold range includes a threshold power, the threshold power plus a power offset, and the threshold power minus the power offset. The at least one controller reduces 50 by a percentage or a fixed amount an initial power level of the intermediate frequency range analog signal after at least one time gap between a plurality of signal transmissions, if the output power level is above the power threshold range, by reducing a gain of the at least one variable gain amplifier 30. The at least one controller 50 increases by the percentage or the fixed amount the initial power level of the intermediate frequency range analog signal if the output power level is below the power threshold range, by increasing the gain of the at least one variable gain amplifier 30. The at least one controller 50 repeats the comparing the output power level to the power threshold range, the reducing by one of the percentage and the fixed amount the initial power level of the intermediate frequency range analog signal, and the increasing by one of the percentage and the fixed amount the initial power level of the intermediate frequency range analog signal until the initial power level of the intermediate frequency range asymptotically approaches the threshold power.

Figure 5:
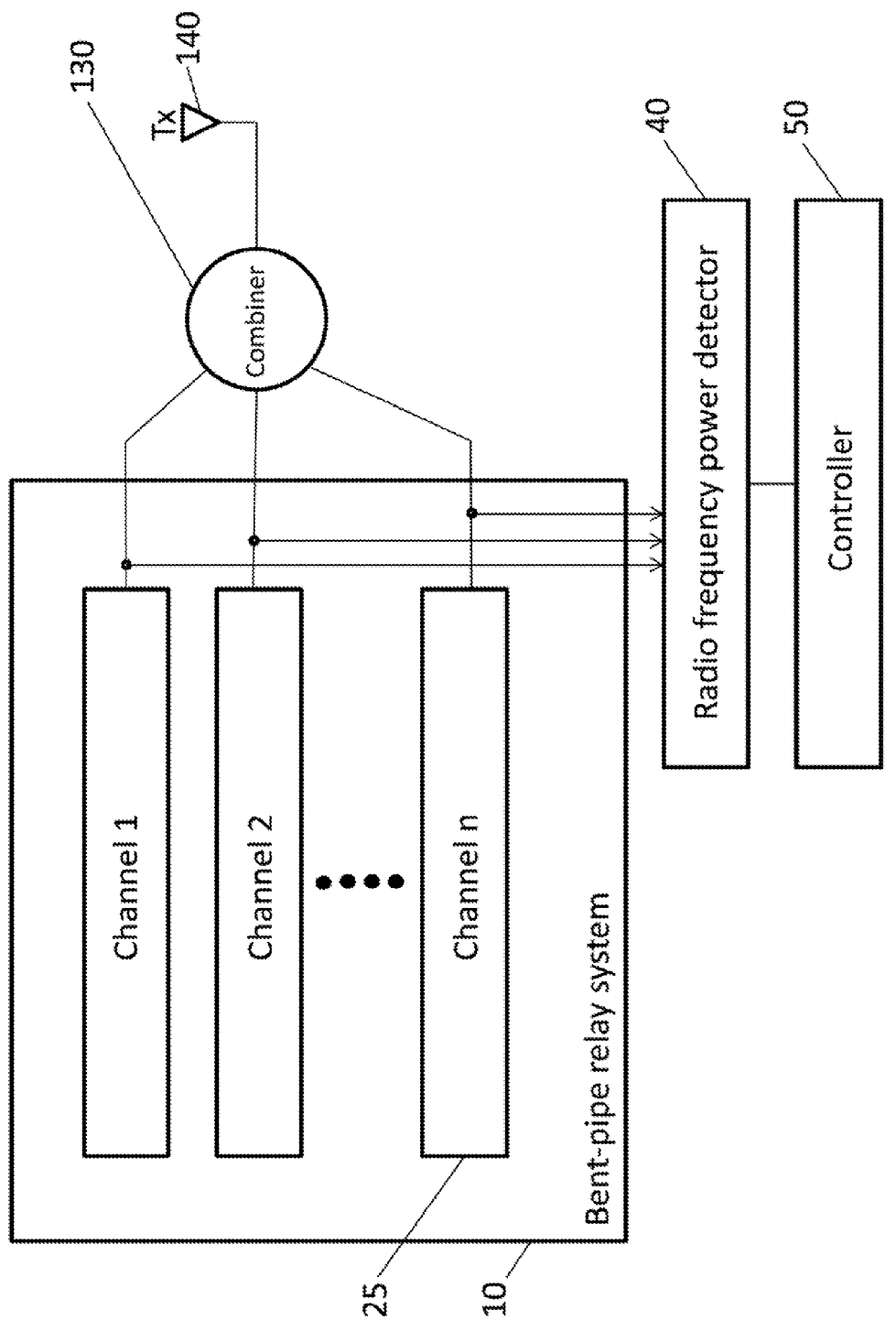
FIG. 5 is a block diagram of an illustrative bent-pipe relay communications system communicating with a radio frequency power detector, a controller, a combiner, and a transmitter according to an embodiment of the instant invention.

Optionally, for example, as shown by way of illustration in FIG. 5, the bent-pipe relay communication system 10 further includes a radio frequency combiner 130 connected to the plurality of bent-pipe relay channels, and a transmitter antenna 140 operably connected to the radio frequency combiner.

Figure 6:
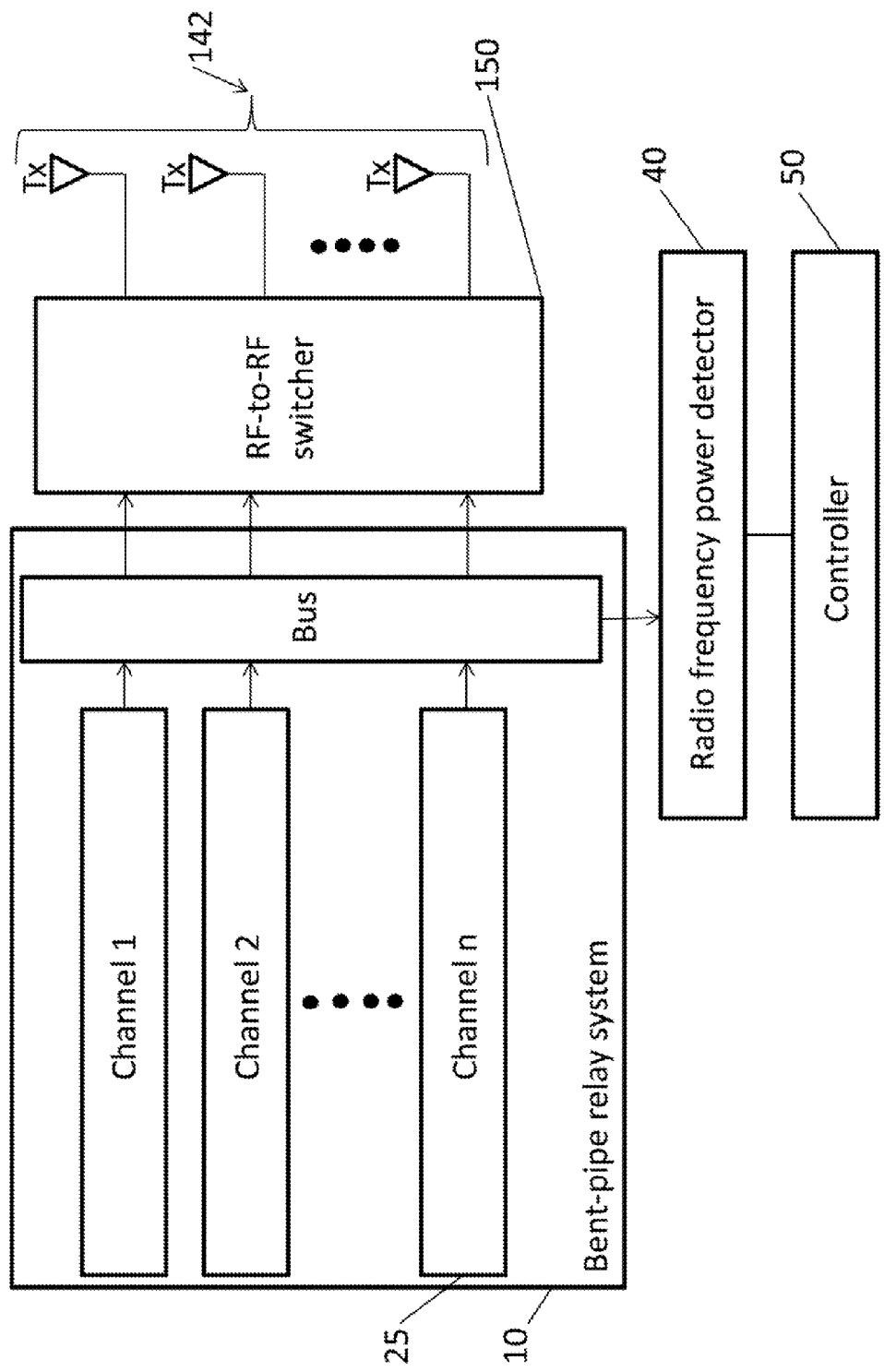
FIG. 6 is a block diagram of an illustrative bent-pipe relay communications system communicating with a radio frequency power detector, a controller, a RF-to-RF switcher, and a plurality of transmitters according to an embodiment of the instant invention.

Optionally, for example, as shown by way of illustration in FIG. 6, the bent-pipe relay communication system 10 further includes a plurality of transmission antennas 142, and a radio-frequency-to-radio-frequency switcher 150 operably connecting the plurality of bent-pipe relay channels to the plurality of transmission antennas.

Optionally, the bent-pipe relay communication system 10 further includes a plurality of transmitter antennas correspondingly connected to the plurality of bent-pipe relay channels.

Figure 7:
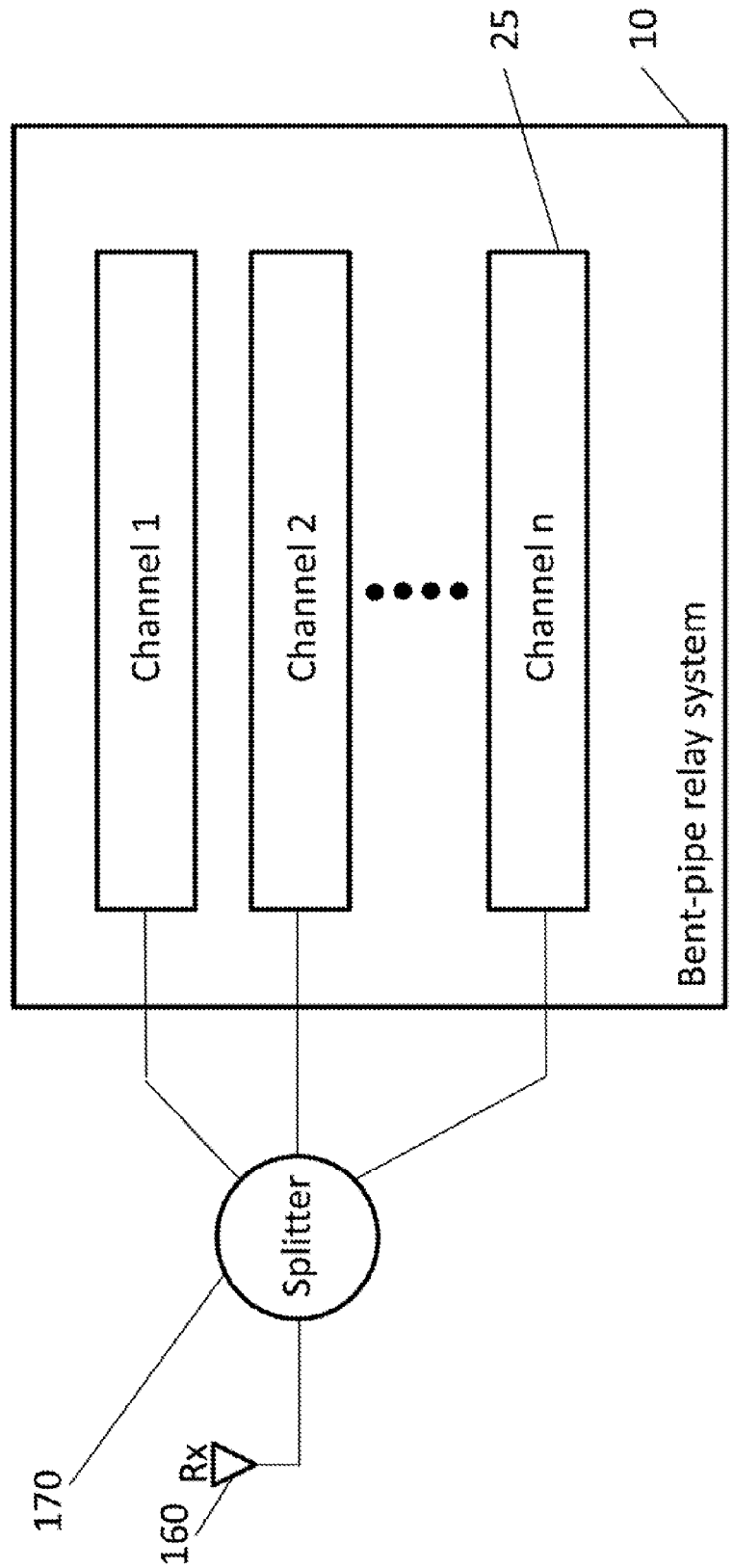
FIG. 7 is a block diagram of an illustrative bent-pipe relay communications system communicating with a splitter and a receiver according to an embodiment of the instant invention.

Optionally, for example, as shown by way of illustration in FIG. 7, the bent-pipe relay communication system 10 further includes a receiver antenna 160, and a radio-frequency-to-radio-frequency splitter 170 operably connecting the receiver antenna to the plurality of bent-pipe relay channels.

Figure 8:
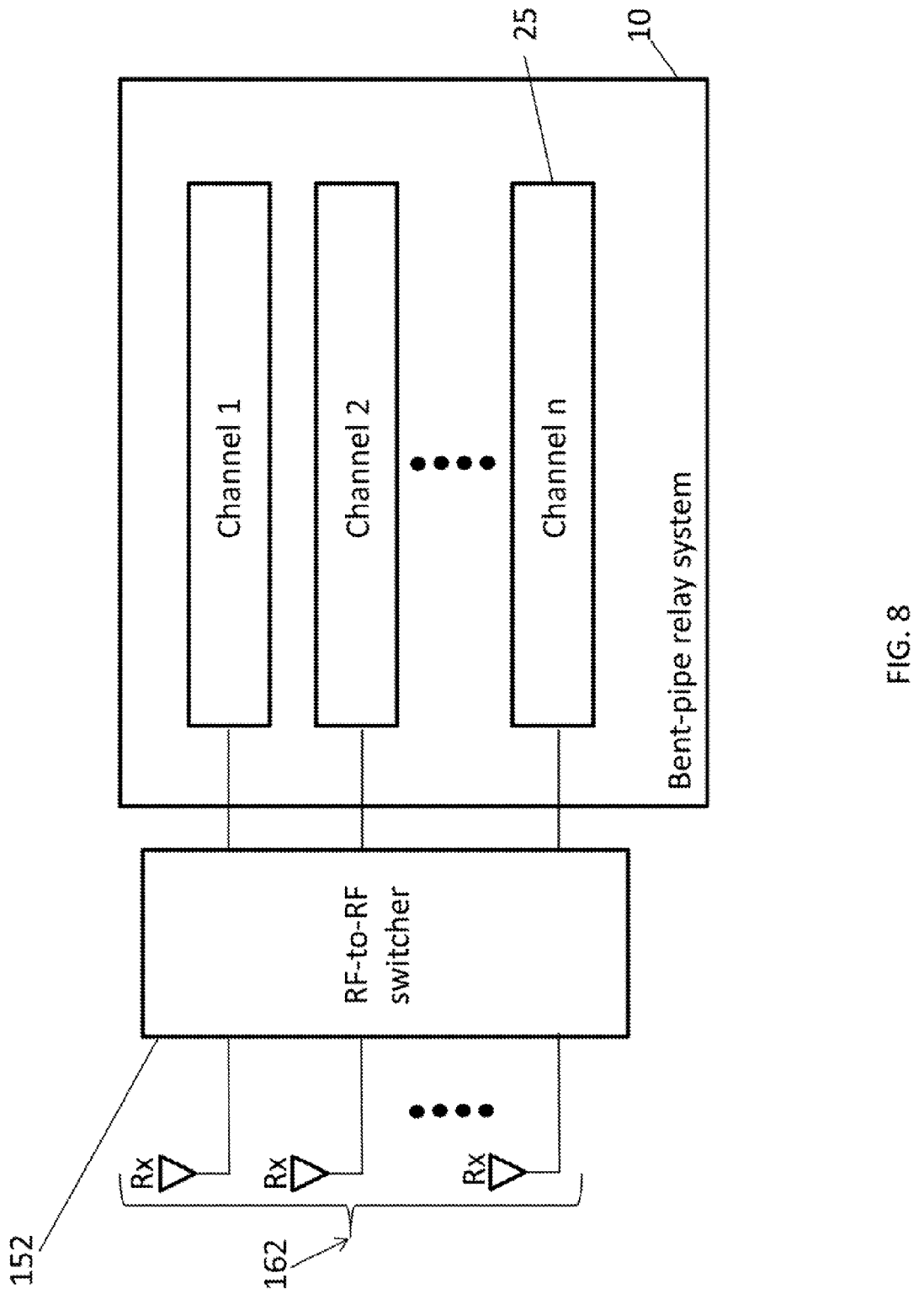
FIG. 8 is a block diagram of an illustrative bent-pipe relay communications system communicating with a RF-to-RF switcher and a plurality of receivers according to an embodiment of the instant invention.

Optionally, for example, as shown by way of illustration in FIG. 8, the bent-pipe relay communication system 10 further includes a plurality of receiver antennas 162, and a radio-frequency-to-radio-frequency switcher 152 operably connecting the plurality of receiver antennas to the plurality of bent-pipe relay channels 20.

Optionally, the at least one radio frequency power detector 40 includes a plurality of radio frequency power detectors correspondingly connected to the plurality of bent-pipe relay channels 20.

Optionally, in half-duplex data mode, the plurality of bent-pipe relay channels 20 includes one voice channel and one data, channel, and, in full-duplex data mode, the plurality of bent-pipe relay channels 20 includes one voice channel and two data channels.

Optionally, the bent-pipe relay communication system 10 further includes a standard mobile platform 60 including the plurality of bent-pipe relay channels 20, the at least one radio frequency power detector 40, and the at least one controller 50. As shown by way of illustration in FIG. 2, the mobile platform 60, for example, includes a standard balloon 62, a standard satellite 64, or a standard manned or unmanned aerial vehicle 66.

Figure 4:
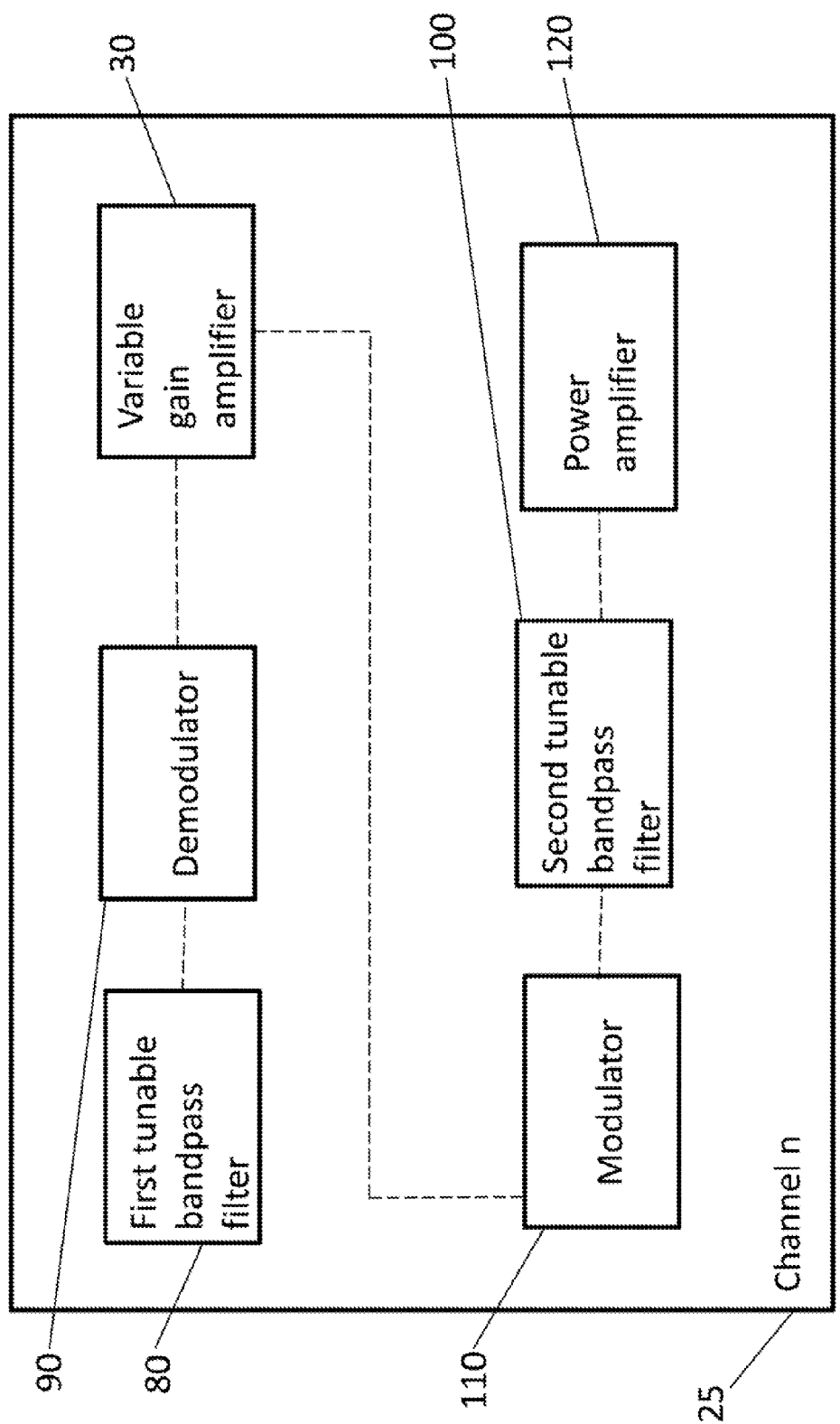
FIG. 4 is a block diagram of an illustrative channel in an illustrative bent-pipe relay communications system according to an embodiment of the instant invention.

Optionally, for example, as shown by way of illustration in FIG. 4, the bent-pipe relay communication system 10 further includes a first tunable bandpass filter 80 communicating with the radio-frequency-to-intermediate-frequency demodulator 90 and with the at least one controller, and/or a second tunable bandpass filter 100 communicating with the intermediate-frequency-to-radio-frequency modulator 110 and with the at least one controller 50. Optionally, the modulator 110 further communicates with a power amplifier 120.

Optionally, the at least one controller comprises a sampling period. The at least one controller adjusts the sampling period for each channel of the plurality of bent-pipe relay channels, based on whether the intermediate frequency range analog signal includes a data waveform or a voice waveform.

Optionally, the at least one controller 50 measures a plurality of voltage levels over time to determine a maximum voltage level, which corresponds to a maximum power level for the intermediate frequency range analog signal. Optionally, the at least one controller 50 adjusts a gain based on whether the maximum voltage level is a new voltage level.

Optionally, the at least one controller 50 includes a plurality of controllers correspondingly connected to the plurality of bent-pipe relay channels.

Portions of the invention can operate in a standard computing operating environment, for example, as standard controller, a standard desktop computer, a standard laptop computer, a standard mobile computer, a standard server computer, and the like, in which embodiments of the invention may be practiced. While the invention is described in the general context of program modules that run on an operating system on a personal computer, those skilled in the art will recognize that the invention may also he implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including band-held devices, multiprocessor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. According to an embodiment of the invention, the computer communicates directly or indirectly with the scanner. The computer is co-located with the scanner, adjacent to the scanner, or located at a distance from the scanner. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed as new and desired to be protected by Letters Patent of the United States is:

1. A method of providing automatic gain control for a bent-pipe relay communications system, the bent-pipe relay communications system comprising a plurality of bent-pipe relay channels, each channel of the plurality of bent-pipe relay channels comprising at least one programmable variable gain amplifier and an output power detector communicating with the variable gain amplifier, the method comprising:
sampling an output power level of an intermediate frequency range analog signal in the each channel of the plurality of bent-pipe relay channels using the each output power detector;
comparing the output power level to a power threshold range, the power threshold range comprising a threshold power, the threshold power plus a power offset, and the threshold power minus the power offset;
reducing by one of a percentage and a fixed amount a gain of the intermediate frequency range analog signal after at least one gap between a plurality of signal transmissions, if the output power level is above the power threshold range, by controlling the at least one variable gain amplifier;
increasing by one of the percentage and the fixed amount the gain of the intermediate frequency range analog signal, if the output power level is below the power threshold range, by controlling the at least one variable gain amplifier;
repeating the comparing the output power level to the power threshold range, the reducing by one of the percentage and the fixed amount the gain of the intermediate frequency range analog signal, and the increasing by one of the percentage and the fixed amount the gain of the intermediate frequency range analog signal until an initial power level of the intermediate frequency range asymptotically approaches the threshold power.

2. The method according to claim 1, further comprising:
providing a controller communicating with each variable gain amplifier and each output power detector, wherein the controller comprises one of a microcontroller, as microprocessor, a central processing unit, a field programmable gate array, and a system-on-chip.

3. The method according to claim 1, further comprising:
providing a plurality of controllers, as respective controller communicating with as respective variable gain amplifier and a respective output power detector, wherein at least one controller of the plurality of controllers comprises one of a microcontroller, a microprocessor, a central processing unit, a field programmable gate array, and a system-on-chip.

4. The method according to claim 1, further comprising:
adjusting as sampling period for each channel of said plurality of bent-pipe relay channels, using at least one controller, based on whether the intermediate frequency range analog signal comprises one of a data waveform and a voice waveform.

5. The method according to claim 1, wherein said sampling an output power level of an intermediate frequency range analog signal in the each channel of the plurality of bent-pipe relay channels using the each output power detector comprises measuring a plurality of voltage levels over time to determine one of a maximum power level for the intermediate frequency range analog signal, and a maximum voltage level corresponding to the maximum power level for the intermediate frequency range analog signal.

6. The method according to claim 5, further comprising:
adjusting the threshold power based on one of whether the maximum power level is different from a current power level, and whether the maximum voltage level is different from a current voltage level.

7. The method according to claim 5, wherein the bent-pipe relay communication system comprises a mobile platform, the mobile platform comprising one of a balloon, a unmanned aerial vehicle, and a satellite.

8. The method according to claim 7, further comprising:
receiving a first radio frequency range signal from a first station, the first station being one of fixed and mobile, the first station being located one of land-based, air-based, and water-based, wherein the first radio frequency range signal is one of analog and digital; and
transmitting a second radio frequency range analog signal to a second station, the second station being one of fixed and mobile, the second station being located one of land-based, air-based, and water-based, wherein the second radio frequency range signal is one of analog and digital.

9. The method according to claim 8, further comprising:
demodulating the first radio frequency range signal to the intermediate frequency range signal; and
modulating the intermediate frequency range signal to the second radio frequency range analog signal.

10. A bent-pipe relay communication system comprising:
a plurality of bent-pipe relay channels, each channel of said plurality of bent-pipe relay channels comprising one of a voice channel and a data channel, said each channel of said plurality of bent-pipe relay channels comprising a radio-frequency-to-intermediate-frequency demodulator, at least one programmable variable gain amplifier, and an intermediate-frequency-to-radio-frequency modulator,
at least one radio frequency power detector operably connected to said intermediate-frequency-to-radio-frequency modulator for said each channel; and
at least one controller communicating with said at least one radio frequency power detector and said at least one variable gain amplifier for said each channel, said at least one controller sampling an output power level of an intermediate frequency range analog signal in said each channel of the plurality of bent-pipe relay channels, said at least one controller comparing the output power level to a power threshold range, the power threshold range comprising a threshold power, the threshold power plus a power offset, and the threshold power minus the power offset, said at least one controller reducing by one of a percentage and a fixed amount an initial power level of the intermediate frequency range analog signal after at least one time gap between a plurality of signal transmissions, if the output power level is above the power threshold range, by reducing a gain of said at least one variable gain amplifier, said at least one controller increasing by one of the percentage and the fixed amount the initial power level of the intermediate frequency range analog signal, if the output power level is below the power threshold range, by increasing the gain of said at least one variable gain amplifier, said at least one controller repeating the comparing the output power level to the power threshold range, the reducing by one of the percentage and the fixed amount the initial power level of the intermediate frequency range analog signal, and the increasing by one of the percentage and the fixed amount the initial power level of the intermediate frequency range analog signal until the initial power level of the intermediate frequency range asymptotically approaches the threshold power.

11. The bent-pipe relay communication system according to claim 10, further comprising:
a radio frequency combiner connected to said plurality of bent-pipe relay channels; and
a transmitter antenna operably connected to said radio frequency combiner.

12. The bent-pipe relay communication system according to claim 10, further comprising:
a plurality of transmission antennas; and
a radio-frequency-to-radio-frequency switcher operably connecting said plurality of bent-pipe relay channels to said plurality of transmission antennas.

13. The bent-pipe relay communication system according to claim 10, further comprising:
a plurality of transmitter antennas correspondingly connected to said plurality of bent-pipe relay channels.

14. The bent-pipe relay communication system according to claim 10, further comprising:
a receiver antenna; and
a radio-frequency-to-radio-frequency splitter operably connecting said receiver antenna to said plurality of bent-pipe relay channels.

15. The bent-pipe relay communication system according to claim 10, further comprising:
a plurality of receiver antennas; and
a radio-frequency-to-radio-frequency switcher operably connecting said plurality of receiver antennas to said plurality of bent-pipe relay channels.

16. The bent-pipe relay communication system according to claim 10, wherein said at least one one radio frequency power detector comprises a plurality of radio frequency power detectors correspondingly connected to said plurality of bent-pipe relay channels.

17. The bent-pipe relay communication system according to claim 10, wherein, in half-duplex data mode, said plurality of bent-pipe relay channels comprises one voice channel and one data channel, and wherein, in full-duplex data mode, said plurality of bent-pipe relay channels comprises one voice channel and two data channels.

18. The bent-pipe relay communication system according to claim 10, further comprises:
a mobile platform comprising said plurality of bent-pipe relay channels, said at least one radio frequency power detector, and said at least one controller, said mobile platform comprising one of a balloon, a unmanned aerial vehicle, and a satellite.

19. The bent-pipe relay communication system according to claim 10, further comprising:
at least one of a first tunable bandpass filter communicating with said radio-frequency-to-intermediate-frequency demodulator and with said at least one controller, and a second tunable bandpass filter communicating with said intermediate-frequency-to-radio-frequency modulator and with said at least one controller.

20. The bent-pipe relay communication system according to claim 10, wherein said at least one controller comprises a sampling period, said at least one controller adjusting the sampling period for each channel of said plurality of bent-pipe relay channels, based on whether the intermediate frequency range analog signal comprises one of a data waveform and a voice waveform.

21. The bent-pipe relay communication system according to claim 10, wherein said at least one controller measures a plurality of voltage levels over time to determine a maximum voltage level, which corresponds to a maximum power level for the intermediate frequency range analog signal.

22. The bent-pipe relay communication system according to claim 21, wherein said at least one controller adjusts a gain based on whether the maximum voltage level is a new voltage level.

23. The bent-pipe relay communication system according to claim 10, wherein said at least one controller comprises a plurality of controllers correspondingly connected to said plurality of bent-pipe relay channels.

* * * * *